(12) United States Patent
Lee

(10) Patent No.: US 8,235,637 B2
(45) Date of Patent: Aug. 7, 2012

(54) ANTI-LOOSEN SELF-TAPPING SCREW

(76) Inventor: Richard Lee, Chungho (TW)

( * ) Notice: Subject to any disclaimer, the term of this patent is extended or adjusted under 35 U.S.C. 154(b) by 309 days.

(21) Appl. No.: 12/793,760

(22) Filed: Jun. 4, 2010

(65) Prior Publication Data

US 2011/0299958 A1    Dec. 8, 2011

(51) Int. Cl.
*F16B 35/04* (2006.01)
(52) U.S. Cl. .............. 411/417; 411/387.3; 606/316
(58) Field of Classification Search ............ 411/417, 411/418, 386, 387.2, 387.3, 387.4, 387.5, 411/387.8; 606/312, 314, 316
See application file for complete search history.

(56) References Cited

U.S. PATENT DOCUMENTS

| | | | | |
|---|---|---|---|---|
| 2,079,408 | A * | 5/1937 | Hosker et al. | 359/548 |
| 6,106,208 | A * | 8/2000 | Lin | 411/418 |
| 6,755,835 | B2 * | 6/2004 | Schultheiss et al. | 606/304 |
| 6,979,163 | B2 * | 12/2005 | Brletich et al. | 411/418 |
| 7,399,231 | B2 * | 7/2008 | Glimpel et al. | 470/204 |
| 7,832,791 | B2 * | 11/2010 | Wojcik et al. | 296/146.8 |

\* cited by examiner

*Primary Examiner* — Gary Estremsky
(74) *Attorney, Agent, or Firm* — Chun-Ming Shih; HDLS IPR Services

(57) ABSTRACT

The anti-loosen self-tapping screw includes a head, rod and a thread. The rod extends from the head and an end of the rod forms a conic tapping tip. The thread is around the rod from the tapping tip to a position near the head. The thread is provided with an axial groove to cut off the thread. The divided ends along one side of the groove are separately provided with expanded portions whose cross-sections are expanded.

9 Claims, 3 Drawing Sheets

ANTI-LOOSEN SELF-TAPPING SCREW

BACKGROUND OF THE INVENTION

1. Technical Field

The invention generally relates to screws, particularly to self-tapping screws.

2. Related Art

Conventional screws are made of metallic materials. A screw is composed of a head, a rod extending from the head and a thread around the rod. To accomplish the effect of anti-loosen, a traditional approach is to form an expanded portion at an end of the thread.

However, the traditional anti-loosen screw is not good enough in aspects of tightness and toughness.

SUMMARY OF THE INVENTION

An object of the invention is to provide an anti-loosen self-tapping screw which enhances tightness and toughness by means of an anti-reverse force from the special thread.

To accomplish the above object, the anti-loosen self-tapping screw of the invention includes a head, rod and a thread. The rod extends from the head and an end of the rod forms a conic tapping tip. The thread is around the rod from the tapping tip to a position near the head. The thread is provided with an axial groove to cut off the thread. The divided ends along one side of the groove are separately provided with expanded portions whose cross-sections are expanded.

DETAILED DESCRIPTION OF THE INVENTION

Figure 1:
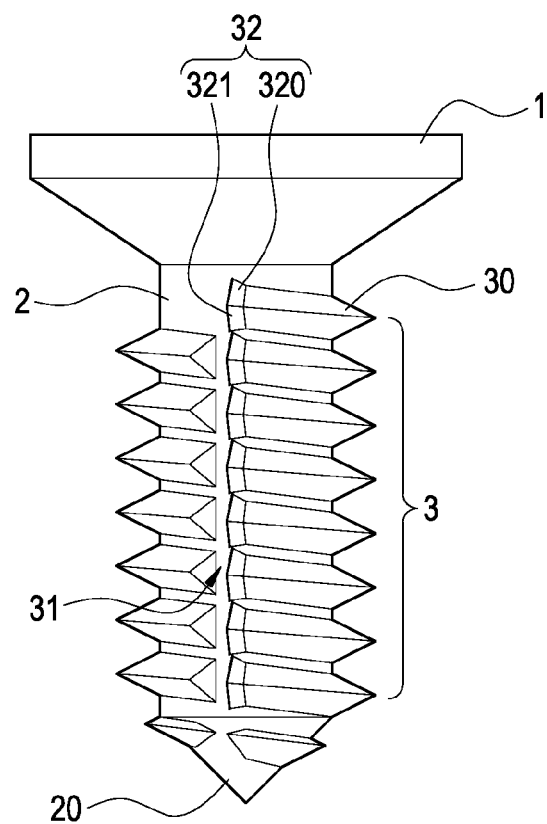
FIG. 1 is a side view of the first embodiment of the invention.
Figure 2:
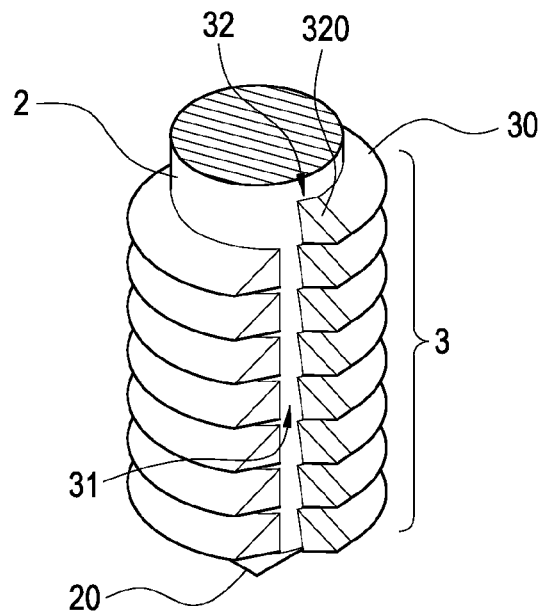
FIG. 2 is a partially perspective view of FIG. 1.

Please refer to FIGS. 1 and 2, which are a side view and partially perspective view, respectively. The screw can be made of ceramic, metallic or composite material. The anti-loosen self-tapping screw includes a head 1, rod 2 and a thread 3. The rod 2 extends from the head 1. An end of the rod 2 forms a conic tapping tip 20. The thread 3 is around the rod 2 from the tapping tip 20 to a position near the head 1.

The thread 3 is provided with an axial groove 31 to longitudinally cut off the thread 3. In the embodiment shown in the drawings, the groove 31 completely cuts off the thread 3. But it is available that the groove 31 partially cuts off the thread 3. Thus the thread 3 is discontinuous due to the groove 31. The divided ends of thread sections 30 along one side of the groove 31 are separately provided with expanded portions 32 whose cross-sections are expanded. The expanded portions 32 may generate an anti-reverse force to prevent the screw from loosening. Besides, the groove 31 may be more than one in number.

Figure 3:
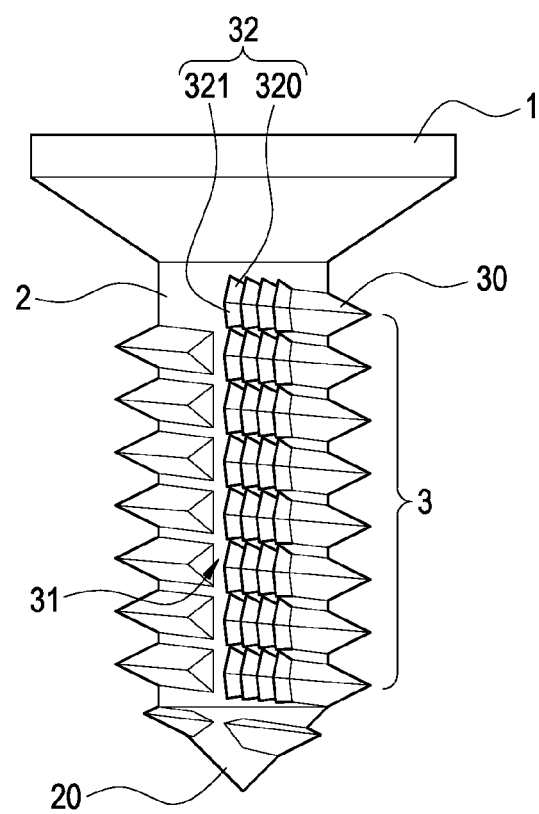
FIG. 3 is a side view of the second embodiment of the invention.
Figure 4:
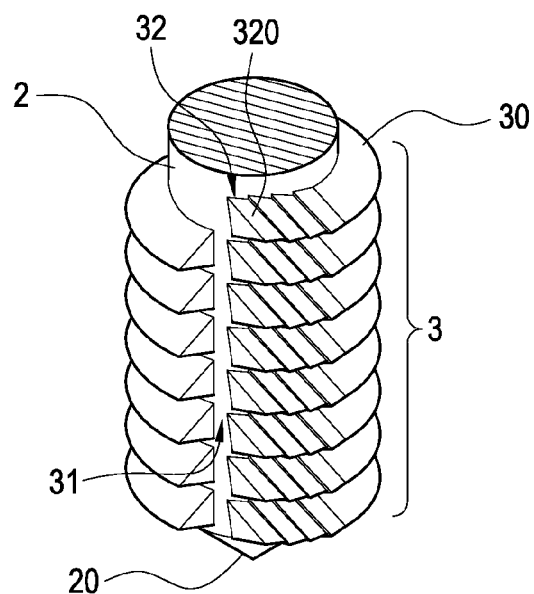
FIG. 4 is a partially perspective view of FIG. 3.
Figure 5:
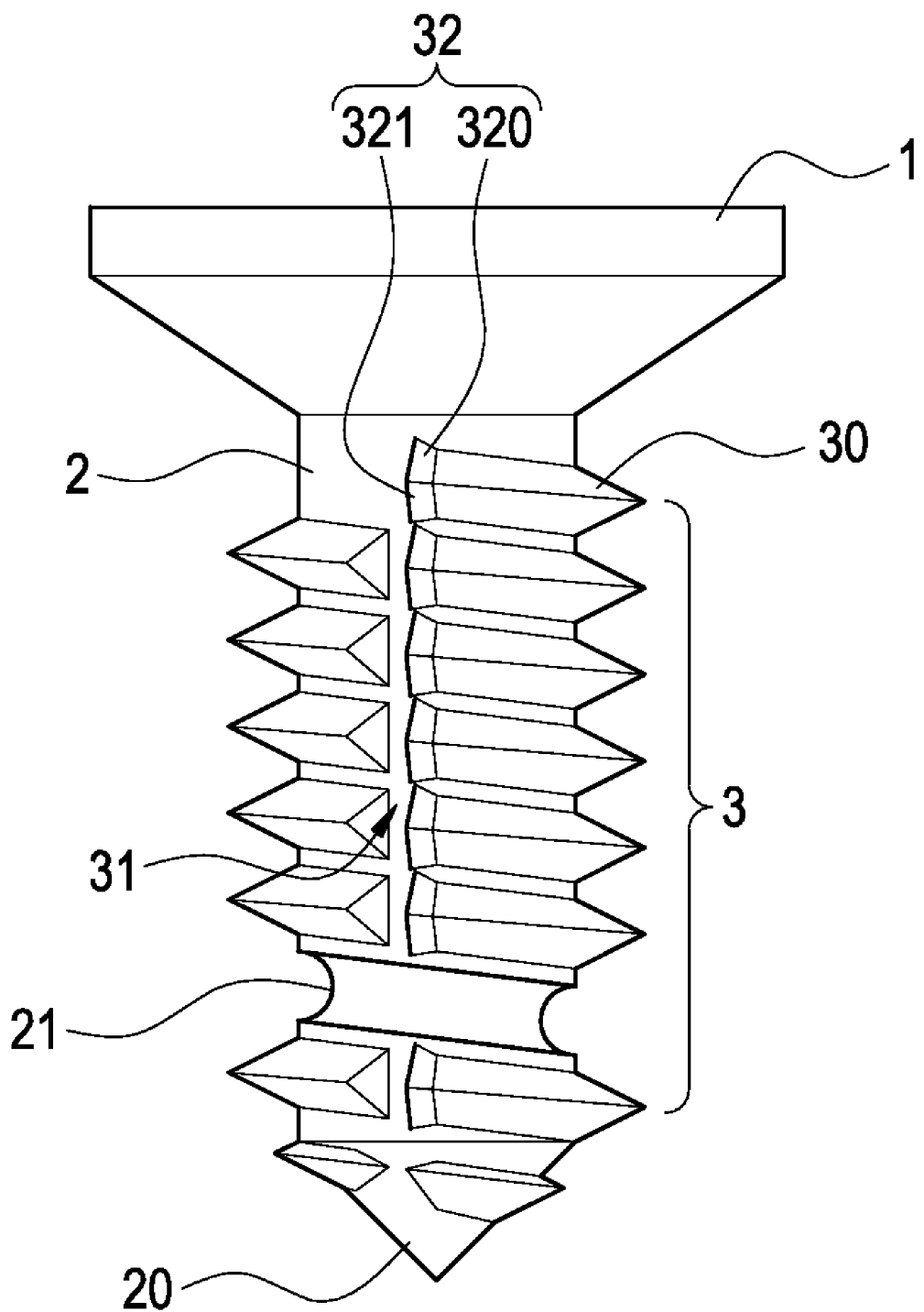
FIG. 5 is a side view of the third embodiment of the invention.

As can be seen in the drawings, each the expanded portion 32 is composed of a base 321 and a tapering surface 320. The tapering surface 320 follows the tightening direction of the thread 3, so the expanded base 321 may resist the reverse rotation of the screw. FIGS. 3 and 4 show another embodiment of the invention. In this embodiment, each of the expanded portions 32 of thread sections 30 is composed of a plurality of bases 321 and tapering surfaces 320, which are in a row. This arrangement may further enhance the anti-reverse force. As shown in FIG. 5, an annular slot 21 is provided between two thread sections 30 of the thread 3 and follows the direction of the thread 3. The annular slot may be more than one in number and may not be 360 degrees. This embodiment can be applied in organisms such as gums and cartilages. The annular slot 21 can be used to stuff additives such as medicines or binder.

While exemplary embodiments of the foregoing invention have been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. An anti-loosen self-tapping screw comprising:
   a head,
   a rod extending from the head, wherein an end of the rod forms a conic tapping tip; and
   a thread around the rod from the tapping tip to a position near the head;
   wherein the thread is provided with an axial groove to cut off the thread, divided ends of the thread along one side of the groove are separately provided with expanded portions whose cross-sections are expanded.

2. The screw of claim 1, wherein the head, the rod and the thread are integratedly made of ceramic material.

3. The screw of claim 1, wherein the groove extends from an end of the thread.

4. The screw of claim 1, wherein the groove is more than one in number.

5. The screw of claim 1, wherein each the expanded portion is composed of a base and a tapering surface.

6. The screw of claim 1, wherein each the expanded portion is composed of a plurality of bases and tapering surfaces in a row.

7. The screw of claim 1, further comprising an annular slot disposed in the thread and following a direction of the thread.

8. The screw of claim 7, wherein the annular slot is 360 degrees.

9. The screw of claim 7, wherein the annular slot is more than one in number.

* * * * *